United States Patent
Yasukochi

(10) Patent No.: US 6,661,616 B2
(45) Date of Patent: Dec. 9, 2003

(54) HEAD DRUM ASSEMBLY AND TAPE DRIVE USING THE SAME

(75) Inventor: Hiroyuki Yasukochi, Tokyo (JP)

(73) Assignee: Sony Corporation, Tokyo (JP)

( * ) Notice: Subject to any disclaimer, the term of this patent is extended or adjusted under 35 U.S.C. 154(b) by 185 days.

(21) Appl. No.: 09/950,854

(22) Filed: Sep. 12, 2001

(65) Prior Publication Data

US 2002/0030942 A1 Mar. 14, 2002

(30) Foreign Application Priority Data

Sep. 13, 2000 (JP) .................................... P2000-278073

(51) Int. Cl.[7] ................................................ G11B 5/52
(52) U.S. Cl. ............................................... 360/281.8
(58) Field of Search .................... 360/281.8, 281–281.3

(56) References Cited

U.S. PATENT DOCUMENTS 5,724,215 A * 3/1998 Fayolle .................... 360/281.8

* cited by examiner

*Primary Examiner*—A. J. Heinz
(74) *Attorney, Agent, or Firm*—Jay H. Maioli

(57) ABSTRACT

In a head drum assembly and a tape drive having said head drum assembly, the head drum assembly comprises a fixed shaft secured to a lower stator; a rotor having a motor part, and provided with a magnetic head; an upper stator disposed at a distance in an axial direction with the rotor held and secure to said shaft; and rotary transformers individually provided between the rotor and the stator. Thereby, there is realized a small and high performance head drum assembly and a tape drive in which crosstalk between different transmission system is prevented, and which improved mounting accuracy of rotary transformations.

18 Claims, 6 Drawing Sheets

HEAD DRUM ASSEMBLY AND TAPE DRIVE USING THE SAME

BACKGROUND OF THE INVENTION

1. Field of the Invention

The present invention relates to a head drum assembly and a tape drive using the same. More specifically, the invention relates to the art for preventing crosstalk between different transmission systems in a rotary transformer and improving mounting accuracy of the rotary transformer.

2. Description of the Related Art

With recent trend of a multi-channel of a magnetic head, a head drum assembly provided with plural sets of rotary transformers.

For example, Japanese Patent Application Laid-Open No. H05-274603 shows in FIG. 5 a head drum assembly provided with two sets of rotary transformers as a prior art example.

In the head drum assembly of the above publication, a rotor is supported on the upper end of a rotary shaft supported rotatably on a lower stator, and an upper stator is supported in a cantilevered manner on the extreme end of a support column screwed to the outer peripheral part of the lower stator.

According to the head drum assembly as described above, a set of rotary transformers and a separate set of rotary transformers can be arranged on the opposed surface between the lower stator and the rotor and on the opposed surface between the upper stator and the rotor, respectively, and at least two sets of rotary transformers can be disposed on a single head drum.

In the head drum assembly as described above, since the rotary transformer can be composed of two systems, for example, crosstalk between transmission of reproducing signals and transmission of recording signals can be prevented.

However, in the head drum assembly as described above, since the support column supporting the lower stator is essentially provided in order to lock the upper stator, there causes a problem that the high cost is brought forth, the mounting accuracy of the rotary transformer is poor, and the performance of the rotary transformer lowers.

That is, since the column supporting the lower stator is essentially provided in order to lock the upper stator, the number of parts increases accordingly, and the mounting accuracy of the upper stator lowers unless the dimensional accuracy of the column is enhanced. Particularly, since the upper stator is supported in a cantilevered manner on the support column, the mounting accuracy of a coil plate on the stator side constituting the rotary transformer becomes worsened unless the accuracy of a mounting surface is improved. Since a gap between the stator coil plate opposed to the rotary transformer and a rotor coil plate is of order of scores of $\mu$m, the dimensional accuracy need be much improved, resulting leads higher cost.

Further, a gap between the stator coil plate opposed to the rotary transformer and a rotor coil plate is of order of scores of $\mu$m, an area of the mounting surface of the upper stator supported in a cantilevered manner is small, and such supporting is done by screwing, because of which a fine gap between the opposed stator coil plate and the rotor coil plate is different in side near the support column from the side away from the support column according to a tightening force of a screw.

In Japanese Patent Application Laid-Open No. Hei 5-274603, this problem is solved by two sets of so-called cylindrical rotary transformers which are arranged axially concentrically. In this case, however, the rotary transformers are laminated in an axial direction of the drum, and the height of the drum becomes higher, which is disadvantageous for miniaturization of a tape drive.

SUMMARY OF THE INVENTION

It is therefore an object of the present invention to realize a small type head drum assembly and a tape drive which prevents crosstalk between different transmission systems in a rotary transformer and improves the mounting accuracy of the rotary transformer.

For solving the aforementioned problem, a head drum assembly according to the present invention comprises, a fixed shaft secured to a lower stator; and a rotor having a motor unit and a magnetic head; an upper stator disposed axially with the rotor held and secured to the shaft, and rotary transformers separately provided between the rotor and the stator.

The present invention further provides a tape drive comprising a head drive in which a magnetic head is provided on a rotor and a magnetic tape is wound at a predetermined angle, a guide pin for drawing out a magnetic tape from a tape cassette and winding the drawn magnetic tape about the head drum assembly to form a tape pass, a reel bed for supporting a reel of a tape cassette, and a capstan shaft for traveling a magnetic tape in cooperation with a pinch roller, wherein the head drum assembly comprises, a fixed shaft secured to a lower stator and a rotor having a motor unit and a magnetic head; an upper stator disposed axially with the rotor held and secured to the shaft, and rotary transformers separately provided between the rotor and the stator.

Accordingly, in the head drum assembly and the tape drive using the same, plural sets of rotary transformers can be loaded at a distance axially, and signal transmission systems of different transmission systems can be disposed separately, thus enabling prevention of crosstalk.

Further, the shaft is locked, the rotor is rotatable around the shaft, and the upper and lower stators are fixedly supported. Therefore, the rotor and the stator can be mounted with the shaft as a reference, and the mutual mounting accuracy can be improved whereby the performance of the rotary transformer is not deteriorated, thus enabling provision of a small and high performance rotary transformer.

In the present invention, in the plural systems of the rotary transformers which are of a plane type, the head drum assembly can be constituted to be a small type, and the manufacturing cost can be reduced as compared with the cylindrical rotary transformer.

Further, in the present invention, in the arrangement in which the rotary transformer of the transmission system of recording signals and the rotary transformer of the transmission system of reproducing signals are separated in separated set, crosstalk of signals of the recording system and the reproducing system can be prevented, and particularly, in a rotary drum for a data streamer, the RAW (Read After Write) function can be realized easily.

Furthermore, in the present invention, in the arrangement in which at least one set of rotary transformers is larger in diameter than the outside diameter of a rotor, the large opposed surface of the rotary transformer can be employed for the outside diameter of the rotor, and crosstalk between the transmission systems can be prevented accordingly.

DESCRIPTION OF THE PREFERRED EMBODIMENTS

Details of a head drum assembly and a tape drive using the same according to the present invention will be explained hereinafter in accordance with the embodiments shown in the accompanying drawings.

The head drum assembly and the tape drive described in the embodiments are those applied to a magnetic tape streamer drive known as a data recording device for a computer. The magnetic tape streamer drive has a function capable of reproducing, while recording information in a tape-like recording medium, the information and checking whether or not recording of information is properly carried out, a so-called RAW (Read After Write) function. In order to realize the RAW function, a recording head and a reproducing head are provided. For carrying out transmission of a signal to the recording head and transmission of a signal from the reproducing head, a rotary transformer has a recording signal channel and a reproducing signal channel.

Figure 1:
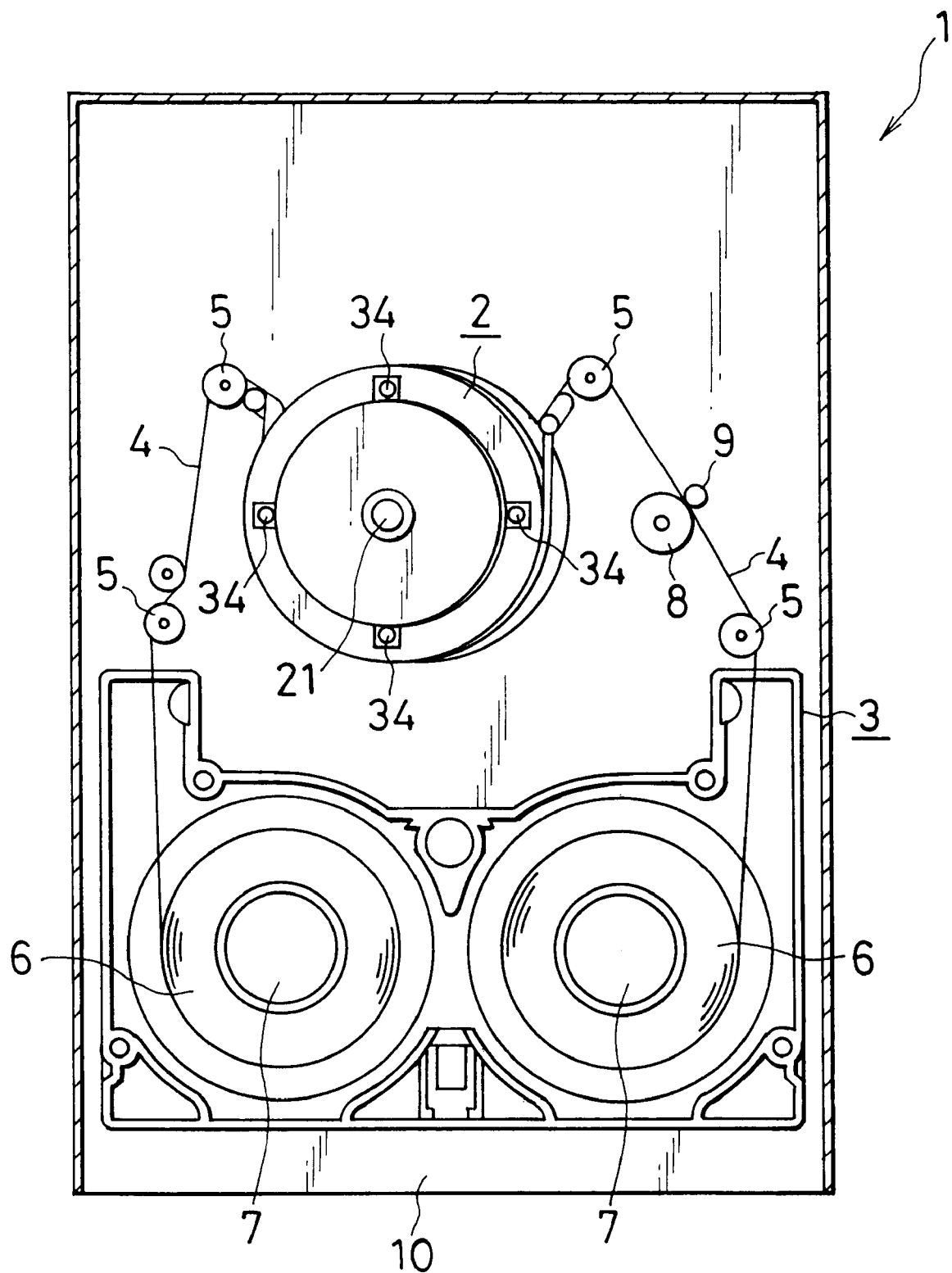
FIG. 1 shows one embodiment of the present invention together with FIGS. 2 to 4, FIG. 1 being a schematic plan view of a tape drive.
Figure 2:
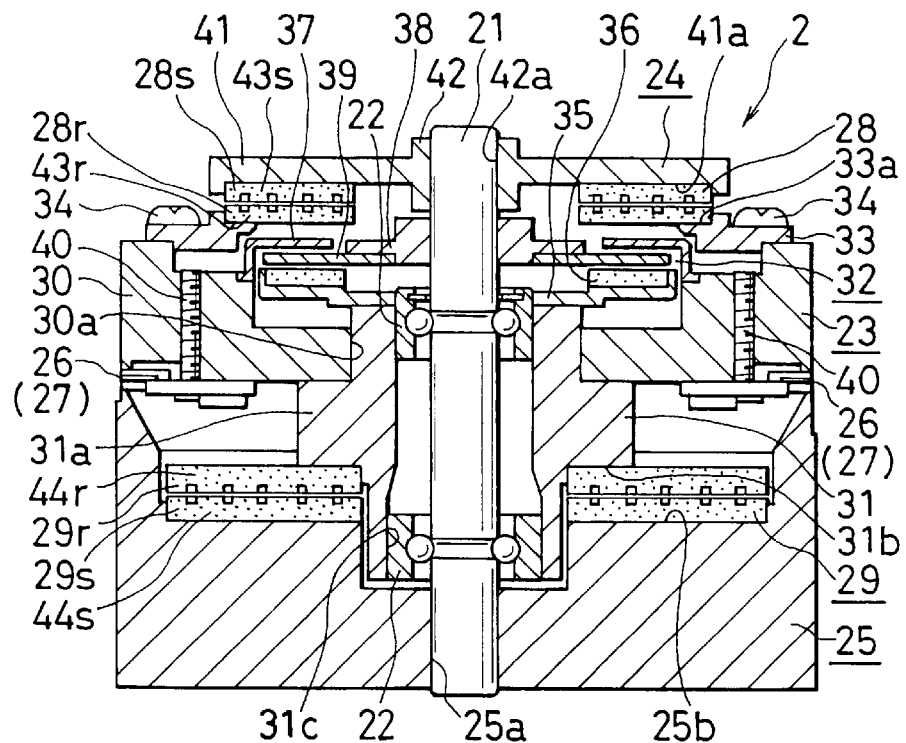
FIG. 2 is a schematic longitudinal view of a head drum assembly.
Figure 3:
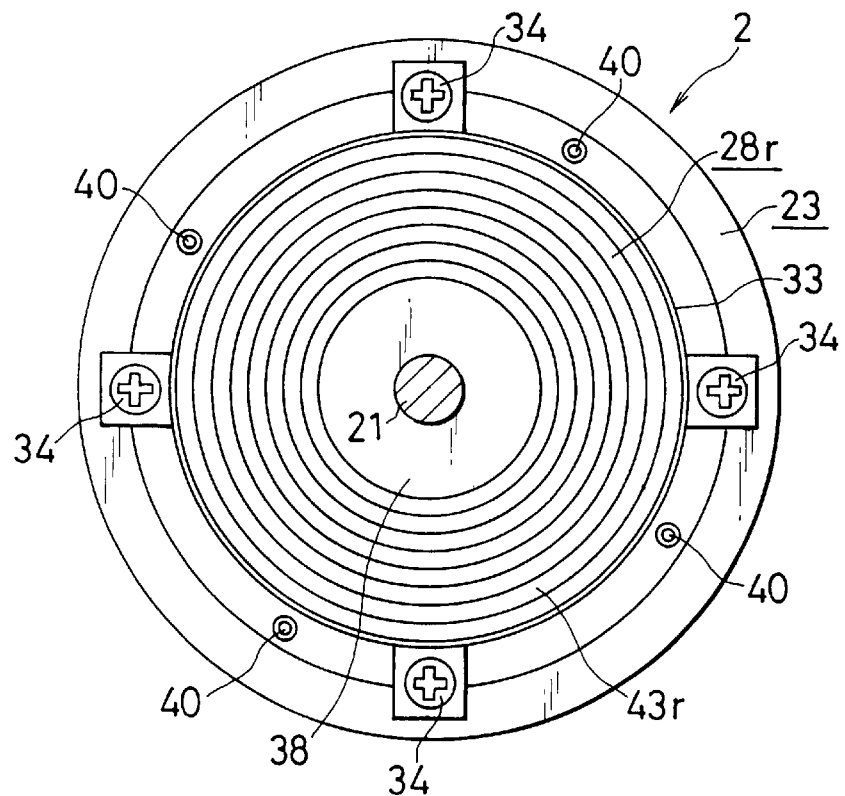
FIG. 3 is a plan view of a head drum assembly showing that an upper stator is removed.
Figure 4:
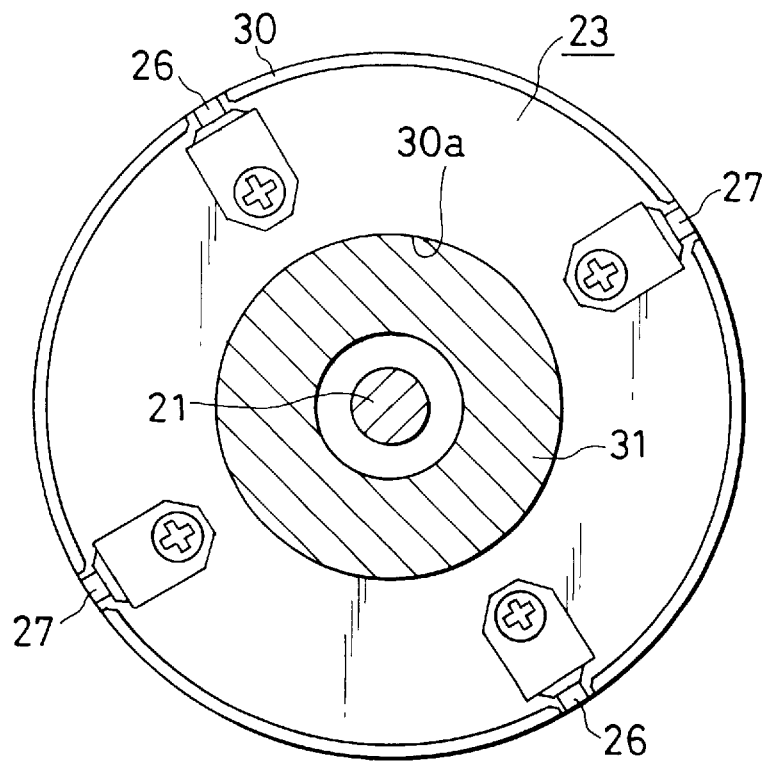
FIG. 4 is a schematic bottom view of a rotor for explaining a positional relation of heads.

FIGS. 1 to 4 show a first embodiment of a head drum assembly for realizing the RAW function as described above. FIG. 1 is a schematic plan view of a tape drive; FIG. 2 is a schematic longitudinal view of a head drum assembly; FIG. 3 is a plan view of a head drum assembly showing that an upper stator is removed; and FIG. 4 is a schematic bottom view of a rotor for explaining a positional relation of heads.

A tape drive 1 comprises a head drum assembly 2, guide pines 5, 5, . . . for drawing a magnetic tape 4 from a tape cassette 3 and winding the drawn magnetic tape 4 around the head drum assembly 2 to form a predetermined tape pass, reel beds 7, 7 for supporting reels 6, 6 of the tape cassette 3, and a capstan shaft 9 for traveling the magnetic tape 4 in cooperation with a pinch roller 8 (see FIG. 1).

The head drum assembly 2 of the tape drive 1 is disposed with its shaft center somewhat inclined with respect to a chassis 10, when the tape cassette 3 is loaded on the cassette loading part, the magnetic tape 4 is drawn on the head drum assembly 2 side by the guide pins 5, 5 and wound around the head drum assembly 2, and the magnetic tape 4 is held by the pinch roller 8 and the capstan shaft 9 to form a tape pass (see FIG. 1).

FIG. 1 schematically shows that state that the tape cassette 3 is loaded on the tape drive 1 to form a tape pass.

When the tape pass is formed, the head drum assembly 2 is rotated, and the capstan shaft 9 is rotated so as to travel the magnetic tape at a constant speed.

The head drum assembly 2 comprises a fixed shaft 21 stood upright on a lower stator 25, a rotor 23 supported rotatably through bearings (direct bearings) 22, 22 with respect to the fixed shaft 21, an upper stator 24 arranged with the rotor 23 held in an axial direction, magnetic heads 26, 26; 27, 27 supported on the rotor 23, a first rotary transformer 28 disposed between the rotor 23 and the upper stator 24, and a second rotary transformer 29 disposed between the rotor 23 and the lower stator 25 (see FIG. 2).

The rotor 23 comprises a somewhat thick cylindrical drum part 30, a boss part 31 pressed into a center hole 30a of the drum part 30, a motor part 32 provided at the upper part, and magnetic heads 26, 26; 27, 27 disposed at equal intervals in a peripheral direction of the outer peripheral edge of the lower surface of the drum part 30 (see FIG. 2).

In the outer peripheral side portion of the upper surfaced of the drum part 30 of the rotor 23, a ring-like holder 33 is stopped by screws 34, 34, . . . (see FIG. 3), shoulders directed upward and downward are formed on the inner peripheral side upper surface of the holder 33, the shoulder having an upwardly directed surface (hereinafter called "attaching surface") 33a to which is attached a rotor coil plate 28r of the first rotary transformer 28 (see FIG. 2).

Further, a thicker portion 31a is formed in the vertical central part of the boss part 31 of the rotor 23, and a rotor coil plate 29r of the second rotary transformer 29 is attached to a lower surface (hereinafter called "attaching surface") 31b of the thicker portion 31a (see FIG. 2).

The motor part 32 is a so-called flat motor, comprising a disk-like yoke plate 35 secured to the upper end of the boss part 31 of the rotor 23, a flat magnet 36 attached to the outer peripheral upper surface of the yoke plate 35, a back yoke 37 supported on the upper part of the drum part 30 of the rotor 23 at a predetermined distance opposed to the magnet 36, and a coil part 39 provided on a flange part 38 pressed into the fixed shaft 21 and arranged in a space between the magnet 36 and the back yoke 37 (FIG. 2).

With respect to the magnetic heads 26, 26; 27, 27, the reproducing heads 26, 26 are disposed at a position deviated by 180° each other, and the recording heads 27, 27 are also disposed at a position deviated by 180° each other (see FIG. 4). Magnetic heads of the same system disposed at a position deviated by 180° each other, the reproducing heads 26, 26; 27, 27 are respectively different in azimuth angle.

Further, with respect to the magnetic heads 26, 26; 27; 27, the height of the magnetic heads 26, 26; 27; 27 can be adjusted by so-called square screws 40, 40, . . . fitted in tapped holes extending through the drum part 30 of the rotor 23 from the above.

The boss part 31 of the rotor 23 is rotatably supported on the fixed shaft 21 through the direct bearings 22, 22 (see FIGS. 2 and 3).

The upper stator 24 comprises a disk-like holder part 41 having the outside diameter smaller than that of the rotor 23, and a boss part 42 provided integrally in the center of the holder part 41, wherein the boss part 42 is pressed into the upper end of the fixed shaft 21 whereby the upper stator 24 is secured to the fixed shaft 21 (see FIG. 2).

A stator coil plate 28s of the first rotary transformer 28 is attached to a lower surface (hereinafter called "attaching surface") 41a of the holder part 41 of the upper stator 24, whereby the stator coil plate 28a and the rotor coil plate 28r arranged oppositely to constitute the first rotary transformer 28 (see FIG. 2).

The lower stator 25 is cylindrical in the thick bottom and has the outside diameter which is generally the same as the drum part 30, the lower stator 25 being provided on the chassis, and the fixed shaft 21 is pressed into the center hole 25a of the lower stator 25 (see FIG. 2).

A stator coil plate 29s of the second rotary transformer 29 is attached to an internal upper surface (hereinafter called "attaching surface") 25b of the lower stator 25, whereby the stator coil plate 29s and the rotor coil plate 29r are arranged oppositely to constitute the second rotary transformer 29 (see FIG. 2).

Thereby, the upper stator 24, the rotor 23, and the lower stator 25 are arranged on the single fixed shaft 21 from the top in said order, and only the rotor 23 is rotated by the drive force of the motor part 32 (see FIG. 2).

Both two rotary transformers 28, 29 are so-called plane type rotary transformers arranged in the form of a flat plate in a radial direction, comprising opposed two stator coil plates 28s (29s) and rotor coil plates 28r (29r). The stator coil plates 28s (29s) and rotor coil plates 28r (29r) comprise cores 43s, 43r; 44s, 44r formed in the form of a disk, and windings (not shown) respectively provided in a plurality of coil winding grooves formed in surfaces opposed to each other of the cores 43s, 43r; 44s, 44r. These stator coil plates 28s (29s) and rotor coil plates 28r (29r) are opposed in parallel at a distance of a fine gap so that the corresponding windings are opposed (see FIG. 2). It is noted that the gap between the stator coil plate 28s (29s) and the rotor coil plate 28r (29r) is formed to be scores of $\mu$m (for example, 50 $\mu$m) with the trend of miniaturization and higher performance of the head drum assembly 2.

The stator coil plates 28s, 29s and the rotor coil plates 28r, 29r are to be individually attached to the attaching surfaces 41a, 25b, 33a, 31b. These attaching surfaces 41a, 25b, 33a, 31b can be formed in good accuracy with the fixed shaft 21 as a reference to thereby enable to make excellent mounting accuracy of the stator coil plates 28s, 29s and the rotor coil plates 28r, 29r attached to the attaching surfaces 41a, 25b, 33a, 31b.

That is, the attaching surface 41a is a lower surface of the holder part 41 of the upper stator 24, which is a surface orthogonal to the center hole 42a of the boss part 42 of the upper stator 24. The center hole 42a and the attaching surface 41a can be processed in the state that the upper stator 24 is fixed by one chucking, to enable the processing accuracy make excellent.

The attaching surface 25b is an internal upper surface of the lower stator 25, which is a surface orthogonal to the center hole 25a of the lower stator 25. The center hole 25a and the attaching surface 25b can be processed in the state that the lower stator 25 is fixed by one chucking, to enable the processing accuracy make excellent.

The attaching surface 33a is a surface directed upward of the holder 33 stopped by screw to the upper part of the rotor 23, and the dimensional accuracy of the holder 33 itself can be improved very easily. That is stopped by screw to the upper part of the rotor 23. This screwing can be done, using a plurality of screws 34, 34, . . . by evenly tightening in a peripheral direction. Since the cantilevered procedure as described above with respect to prior art is not employed, the mounting accuracy is not lowered. Thereby, the processing accuracy of the attaching surface 33a can be improved.

The attaching surface 31b is a lower surface of a thicker portion 31a in the central part vertically of the boss part 31 of the rotor 23, which is a surface orthogonal to a pressed hole 31c of the direct bearings 22, 22 of the boss part 31 of the rotor 24. The pressed hole 31c and the attaching surface 31b can be processed in the state that the rotor 23 is fixed by one chucking, to enable the processing accuracy make excellent.

As described above, the attaching surfaces 41a, 25b, 33a, 31b can be processed with high precision. Accordingly, mounting of the stator coil plates 28a, 29s, and the rotor coil plates 28r, 29r attached to the attaching surfaces 41a, 25b, 33a, 31b can be accomplished with high accuracy.

Then, a gap of the coil plates 28r, 28s; 29r, 29s of the rotary transformers 28, 29 can be made fine, to thereby enhance the performance of the rotary transformers 28, 29.

Moreover, in the single head drum assembly 2, the two rotary transformers 28, 29 can be provided, and at least two systems of signal transmission can be carried out without crosstalk, contributing to realization of multi-channel.

There can be used the first rotary transformer 28 for transmission of a reproducing signal, and the second transformer 29 for transmission of a recording signal and transmission of power. The second rotary transformer 29 is usually used for two systems, one for transmission of recording signals and the other for transmission of power, because the recording signal is great in output as compared with the reproducing signal and is hard to be affected by the power transmission signal.

Further in the present embodiment, despite the head drum assembly having at least two systems of rotary transformers, miniaturization in axial size can be attained by employing the plane type rotary transformers 28, 29 as compared with the cylindrical type rotary transformer, and in addition the manufacturing cost can be reduced.

Figure 5:
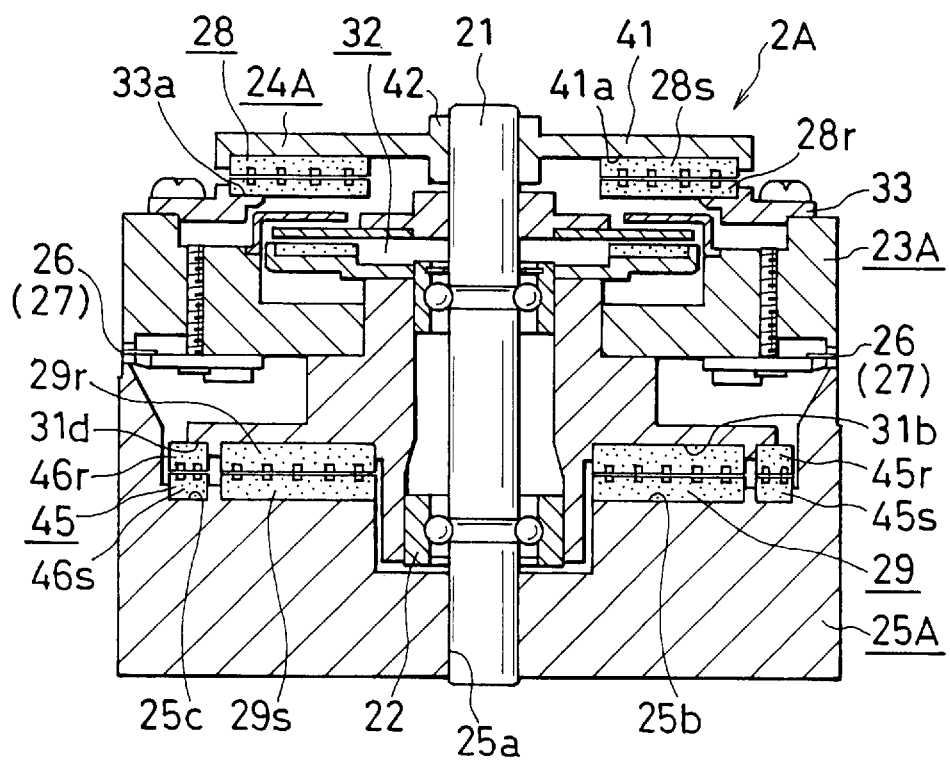
FIG. 5 is a schematic longitudinal view of a head drum assembly, showing a second embodiment.

FIG. 5 shows a second embodiment of the head drum assembly according to the present invention, which is merely different from the above-described first embodiment in that a third rotary transformer is provided externally to the second rotary transformer in addition to the second rotary transformer. Therefore, only different points are described assigning new reference numerals, and omit a description for other parts being indicated by the same reference numerals as those used in similar parts in the head drum assembly according to the first embodiment.

A third rotary transformer 45 of a head drum assembly 2A is also a plane type rotary transformer similar to the first and second rotary transformers 28, 29, in which annular coil winding grooves are formed in ring-like cores 46s, 46r, windings (not shown) are disposed in the coil winding grooves, a stator coil plate 45s and a rotor coil plate 45r, and the third rotary transformer 45 as described is utilized for transmission of power (see FIG. 5).

The cores 46s, 46r of the third rotary transformer 45 as described are formed to have a size larger than the cores 44s, 44r of the second rotary transformer 29 and are arranged within the same plane (see FIG. 5).

That is, a depressed part is further formed externally of the attaching surface 25b of the stator side core 44s of the second rotary transformer 29, which depressed part constitutes an attaching surface of the stator side core 46s of the third rotary transformer 45, and a shoulder part is further formed externally of the attaching surface 31b of the rotor side core 44r of the second rotary transformer 29, and a bottom surface 31d of the shoulder part constitutes an attaching surface of the rotor side core 46r of the third rotary transformer 45 (see FIG. 5).

These attaching surfaces 25c, 31d enable to make the processing accuracy excellent similar to the attaching surfaces 25b, 31b of the cores 44s, 44r of the second rotary transformer 29. Accordingly, the mounting accuracy of the stator coil plate 45s and the rotor coil plate 45r can be improved.

The third rotary transformer 45 as described is separately provided to enable separation from other signal transmission systems, so that crosstalk between different transmission systems can be prevented mostly.

Further, the cores 46s, 46r can be different in material from the cores 43s, 43r; 44s, 44r of the first and second rotary transformers 28, 29. The first and second rotary transformers 28, 29 are utilized for transmission of relatively high frequency (scores of MHz) of a reproducing signal and a recording signal, whereas the third rotary transformer 45 is used for transmission of relatively low frequency (hundreds of KHz) used for supplying power. Therefore, the cores 43s, 43r; 44s, 44r, 46s, 46r are normally made by sintering of ferrite, but the proportion of the contents can be suitably adjusted to change permeability, and optimization of a signal to be transmitted relative to frequency can be attained.

Figure 6:
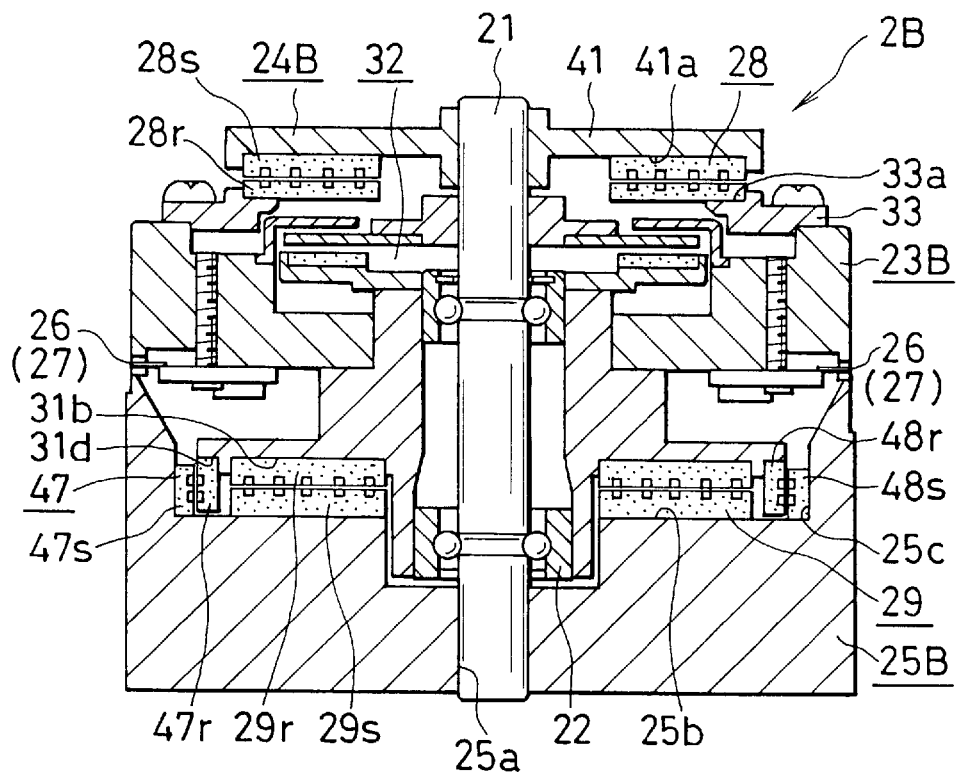
FIG. 6 is a schematic longitudinal view of a head drum assembly, showing a third embodiment.

FIG. 6 shows a third embodiment of the head drum assembly according to the present invention, which is merely different from the above-described second embodiment in that the third rotary transformer is changed from the plane type to the cylindrical type. Therefore, with respect to other parts, only main parts of those parts similar to reference numerals used in the head drum assembly 2A in the first embodiment are shown, and only different points are described, and omit a description for other parts being indicated by the same reference numerals as those used in similar parts in the head drum assembly according to the first embodiment.

A third rotary transformer 47 of a head drum assembly 2B is a cylindrical type rotary transformer, comprising a cylindrical stator side core 48s and a cylindrical rotor side core 48r having a size smaller than the cylindrical stator side core 48s, in which annular coil winding grooves are formed in a peripheral surface of the stator side core 48s and in an outer peripheral surface of the rotor side core 48r, respectively, windings (not shown) are disposed in the coil winding grooves, a stator coil tube 47s and a rotor coil tube 47r, and the third rotary transformer 47 as described is utilized for transmission of power (see FIG. 6).

The stator side core 48s is attached to an inner peripheral surface (hereinafter called "attaching surface") 25d of a peripheral wall of the lower stator 25, and the rotor side core 48r is attached to a bottom surface 31d of a shoulder formed externally of a rotor side core 44r of the second rotary transformer 9 (see FIG. 6).

These attaching surfaces 25d, 31d enable to make the processing accuracy excellent similar to the attaching surfaces 25b, 31b of the cores 44s, 44r of the second rotary transformer 29. Accordingly, the mounting accuracy of the stator coil tube 47s and the rotor coil tube 47r can be improved.

The third rotary transformer 47 as described is separately provided to enable separation from other signal transmission systems, because of which crosstalk between different transmission systems can be prevented mostly.

Further, since the third rotary transformer 47 is of a cylindrical type, even in a case of multi-channel, the diameter of the rotary drum 2B is not increased.

Recently, a so-called MR head (magneto-resistance type thin film head) is being employed for a reproducing head, and it is essential that power be supplied to the MR head. Therefore it is expected that multi-channel transmission of power is necessary, in which case, a supply of power can be attained without increasing the diameter of the head drum assembly 2B.

Figure 7:
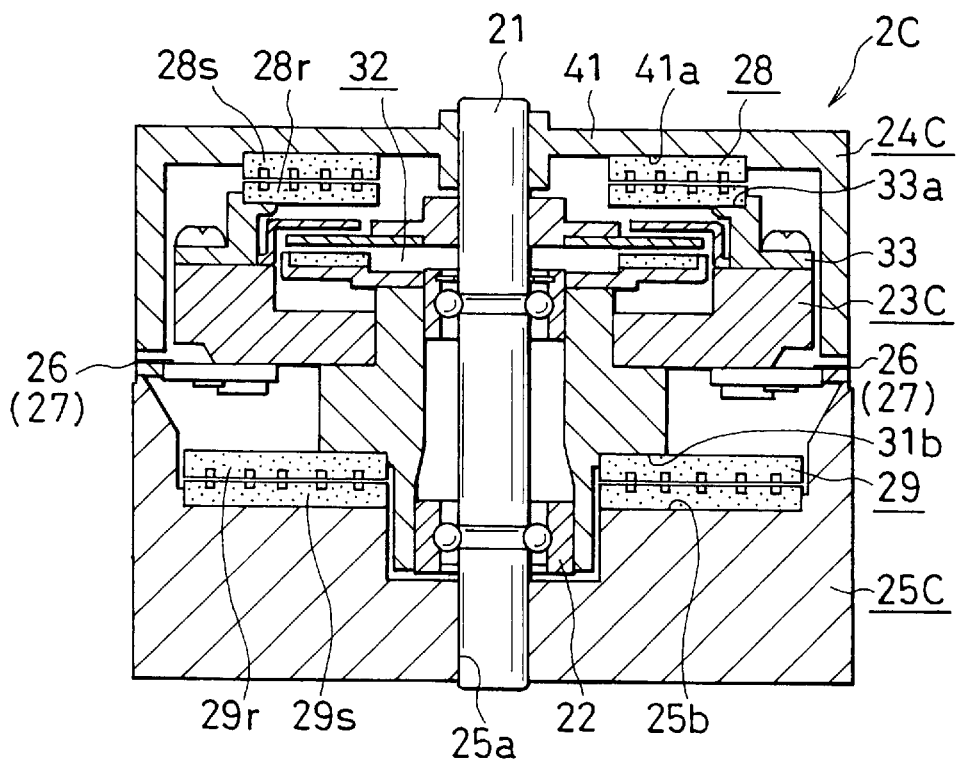
FIG. 7 is a schematic longitudinal view of a head drum assembly, showing a fourth embodiment.

FIG. 7 shows a fourth embodiment of the head drum assembly according to the present invention, which is different from the above-described first embodiment in that this drum is a so-called propeller type rotary drum in which the rotor is concealed within the upper stator, and only the magnetic head is exposed to the outside from a gap between the upper stator and the lower stator.

Accordingly, a description will be made mainly of the point different from the rotary drum 2 according to the first a embodiment, and other parts are indicated by the same reference numerals used in similar parts in the head drum assembly according to the first embodiment to omit the description thereof.

An upper stator 24C of a head drum assembly 2C is formed to be cylindrical in which an upper surface is closed and a lower surface is opened, outside diameter of which is the same as that of the lower stator 25 (FIG. 7).

In a rotor 23C, the outside diameter of a drum part 30A thereof is somewhat smaller than the inside diameter of the upper stator 24C, the drum part 30A being disposed internally of the upper stator 24C, and magnetic heads 26, 26; 27, 27 are disposed at equal intervals in a peripheral direction on the outer peripheral edge of the lower surface of the drum part 30A (FIG. 7).

In the head drum assembly 2C according to the third embodiment as described, only the magnetic heads 26, 26; 27, 27 rotate in the outer peripheral surface, and therefore an air film formed relative to a magnetic tape can be made thinner, contributing to higher recording density (shorter recording wave-length).

Figure 8:
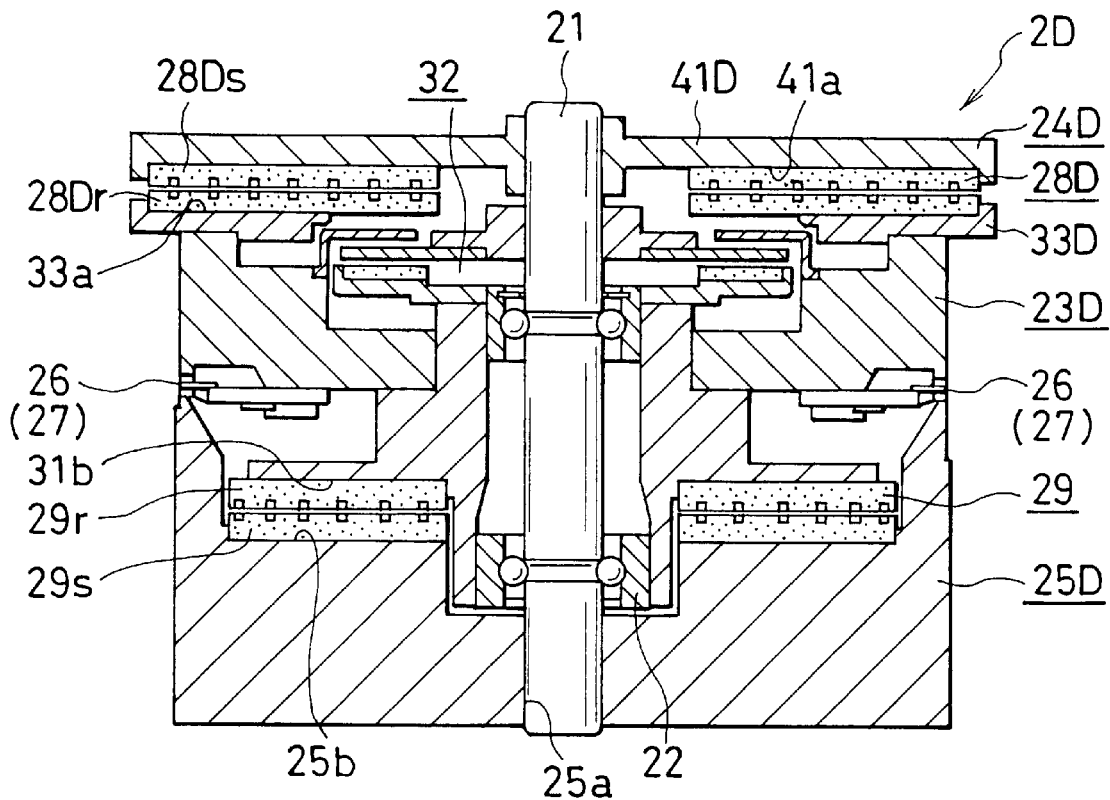
FIG. 8 is a schematic longitudinal view of a head drum assembly, showing a fifth embodiment.

FIG. 8 shows a fifth embodiment of the head drum assembly according to the present invention, which is different from the above-described first embodiment in that the diameter of the first rotary transformer is large.

Accordingly, a description will be made mainly of the point different from the rotary drum 2 according to the first embodiment, and other parts are indicated by the same reference numerals used in similar parts in the head drum assembly according to the first embodiment to omit the description thereof.

On the upper part of a rotor 23D of a head drum assembly 2D is mounted a ring-like holder 33D whose diameter is larger than the rotor 23D, and a rotor coil plate 28Dr of a first rotary transformer 28D is attached to the holder 33D (see FIG. 8).

An upper stator 24D has a holder part 41D having substantially the same diameter as the holder 33D mounted on the rotor 23D, and a stator coil plate 28D of a first rotary transformer 28D is attached to the lower surface of the holder part 41D (see FIG. 8).

In the head drum assembly 2D according to the fifth embodiment provided with the rotary transformer 28D whose outside diameter is larger than the head drum assembly 2D about which a magnetic tape 4 is wound, effective opposed area of the rotary transformer becomes large and it is contributed to multi-channel system, and also crosstalk between different transmission systems can be prevented.

FIGS. 9 to 13 are respectively schematic view showing variations of the head drum assembly according to the present invention in a longitudinal section, which are of a so-called medium drum rotating type in which the outer peripheral surface of a rotor comes in contact with a tape and rotates, and both upper and lower stators come in contact with the tape.

Figure 9:
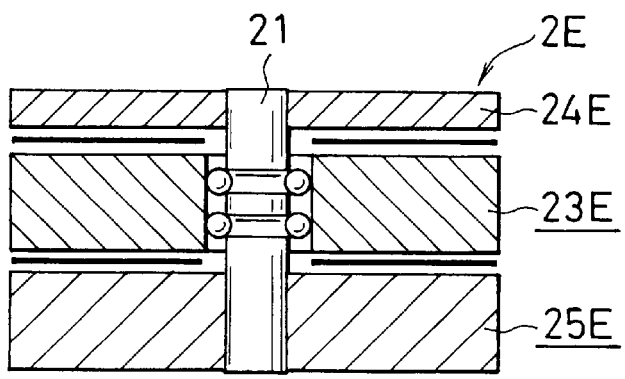
FIG. 9 is a schematic longitudinal sectional view showing a variation of a head drum assembly according to the present invention, together with FIGS. 10 to 13, FIG. 9 showing a first variation.

In a head drum assembly 2E shown in FIG. 9, plane opposed spaces (shown by the thick line in the figure, same in the following) are respectively formed between an upper stator 24E and a rotor 23E and between a lower stator 25E and a rotor 23E, and a plurality of sets of rotary transformers can be disposed in the opposed spaces.

Figure 10:
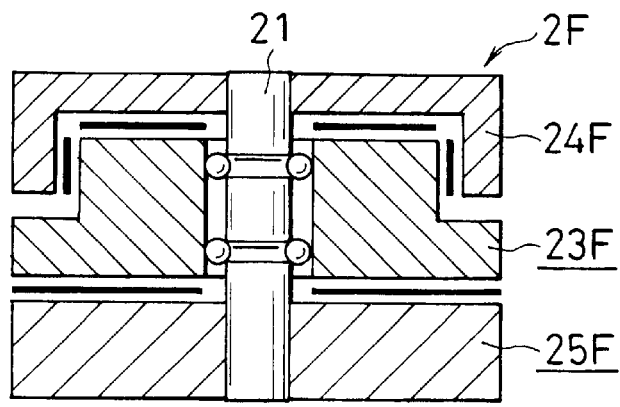
FIG. 10 shows a second variation.

In a head drum assembly 2F shown in FIG. 10, plane opposed spaces are respectively formed between an upper stator 24F and a rotor 23F, and cylindrical opposed spaces are respectively formed between an inner peripheral surface of an upper stator 24F and an outer peripheral surface of a rotor 23F, and a plurality of sets of rotary transformers can be disposed in the opposed spaces.

Figure 11:
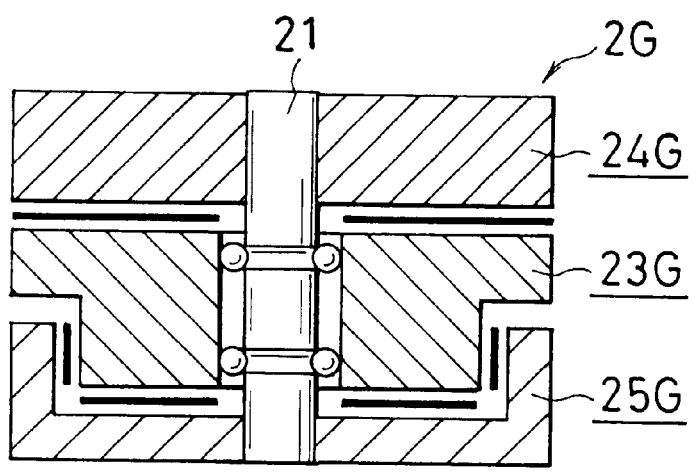
FIG. 11 shows a third variation.

In a head drum assembly 2G shown in FIG. 11, plane opposed spaces are respectively formed between an upper stator 24G and a rotor 23G, and cylindrical opposed spaces are respectively formed between an inner peripheral surface of a lower stator 25G and an outer peripheral surface of a rotor 23G, and a plurality of sets of rotary transformers can be disposed in the opposed spaces.

Figure 12:
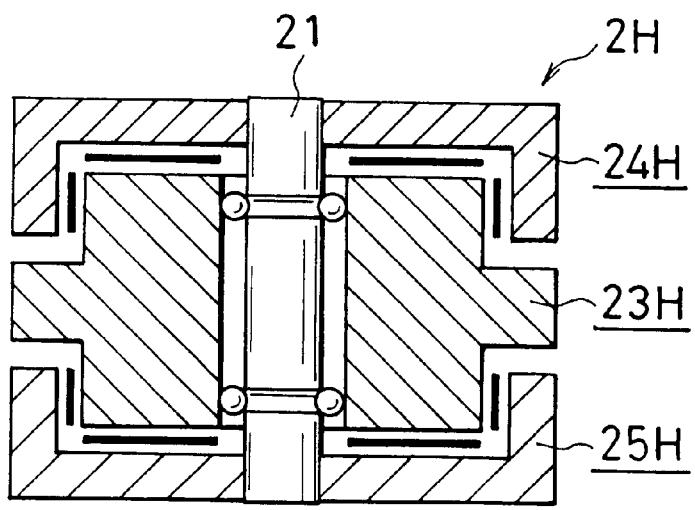
FIG. 12 shows a fourth variation.

In a head drum assembly 2H shown in FIG. 12, plane opposed spaces are respectively formed between an upper stator 24H and a rotor 23H, and cylindrical opposed spaces are respectively formed between an inner peripheral surface of a upper stator 24H and an outer peripheral surface of a rotor 23H, and a plurality of sets of rotary transformers can be disposed in the opposed spaces.

Figure 13:
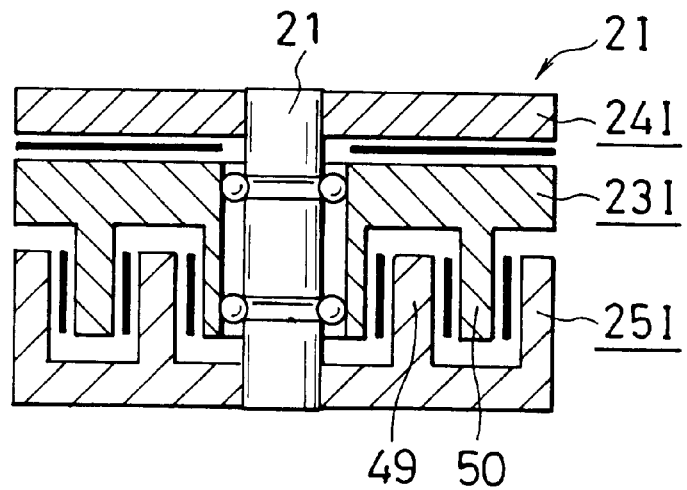
FIG. 13 shows a fifth variation.

In a head drum assembly 2I shown in FIG. 13, plane opposed spaces are respectively formed between an upper stator 24I and a rotor 23I and between a lower stator 25I and a rotor 23I, and cylindrical opposed spaces are respectively formed between inner and outer peripheral surfaces of an inner cylinder 49 formed in a lower stator 25I and inner and outer peripheral surfaces of a cylinder 50 formed in a rotor 23I, and a plurality of sets of rotary transformers can be disposed in the opposed spaces.

While in the above-described embodiments, a description has been made of the rotary drum comprising a reproducing head and a recording head, it is noted that the present invention is not limited thereto but can be also applied to a rotary drum merely provided with a reproducing head.

Further, while the present invention is suitable for a device provided with a RAW function for checking recorded information while recording information on a magnetic tape, like as a magnetic tape streamer drive known as a data recording device for a computer, but it is of course that the invention can be widely applied to general tape drives having no RAW function.

Further, the concrete shapes and constructions of parts shown in the aforementioned embodiments are a mere example in carrying out the present invention, and the technical scope of the present invention should not be interpreted in a limited manner.

What is claimed is:

1. A head drum assembly comprising:

a fixed shaft secured to a lower stator;

a rotor having a motor part, and provided with a magnetic head;

an upper stator disposed at a distance in an axial direction with said rotor held and secured to said shaft; and rotary transformers individually provided between said rotor and said stators.

2. The head drum assembly according to claim 1, wherein the plural systems of rotary transformers are of a plane type arranged in the form of a flat plate in a radial direction.

3. The head drum assembly according to claim 1, wherein a transmission system of a recording signal and a transmission system of a reproducing signal are separated into separate sets of rotary transformers.

4. The head drum assembly according to claim 3, wherein rotary transformers of a power transmission system are further separated and provided.

5. The head drum assembly according to claim 4, wherein the rotary transformers of a power transmission system are provided in an outer peripheral direction from rotary transformers of a recording signal transmission system.

6. The head drum assembly according to claim 4, wherein the rotary transformers of a power transmission system are arranged concentrically in an axial direction.

7. The head drum assembly according to claim 1, wherein said device is of a propeller type in which in said rotor, only a magnetic head is exposed to the outside from a gap between said upper stator and said lower stator.

8. The head drum assembly according to claim 1, wherein at least one rotary transformer is larger than the diameter of an outer peripheral surface of the rotor in contact with a tape.

9. The head drum assembly according to claim 1, wherein said device is of a medium drum rotating type in which the outer peripheral surface of said rotor comes in contact with a tape and rotates, and both upper and lower stators come in contact with the tape.

10. A tape drive comprising a head drum assembly in which a rotor is provided with a magnetic head, and a magnetic tape is wound at a predetermined angle, a guide pin for drawing out a magnetic tape from a tape cassette and winding the drawn magnetic tape around said head drum assembly to form a predetermined tape pass, a reel bed for supporting a reel of the tape cassette, and a capstan shaft for traveling the magnetic tape in corporation with a pinch roller, wherein said head drum assembly comprises a lower stator, a shaft secured thereto, a rotor having a motor part and provided with a magnetic head, an upper stator disposed at a distance in an axial direction with said rotor held and secured to said shaft, and rotary transformers individually provided between said rotor and said stator.

11. The tape drive according to claim 10, wherein in said head drum assembly, plural systems of rotary transformers are arranged in the form of a flat plate in a radial direction.

12. The tape drive according to claim 10, wherein a transmission system of a recording signal and a transmission system of a reproducing signal of said head drum assembly are separated into separate sets of rotary transformers.

13. The tape drive according to claim 12, wherein in said head drum assembly, rotary transformers of a power transmission system are further separated and provided.

14. The tape drive according to claim 13, wherein in said head drum assembly, the rotary transformers of a power transmission system are provided in an outer peripheral direction from rotary transformers of a recording signal transmission system.

15. The tape drive according to claim 13, wherein in said head drum assembly, the rotary transformers of a power transmission system are arranged concentrically in an axial direction.

16. The type drive according to claim 10, wherein said head drum assembly is of a propeller type in which in said rotor, only a magnetic dead is exposed to the outside from a gap between said upper stator and said lower stator.

17. The type drive according to claim 10, wherein in said head drum assembly, at least one rotary transformer is larger than the diameter of an outer peripheral surface of the rotor in contact with a tape.

18. The tape drive according to claim 10, wherein said head drum assembly is of a medium drum rotating type in which the outer peripheral surface of said rotor comes in contact with a tape rotates, and both upper and lower stators come in contact with the tape.

* * * * *